Oct. 22, 1946.  M. S. MOSKEY  2,409,783
PROCESS FOR FORMING ARTIFICIAL TEETH
Original Filed March 20, 1942  2 Sheets-Sheet 1
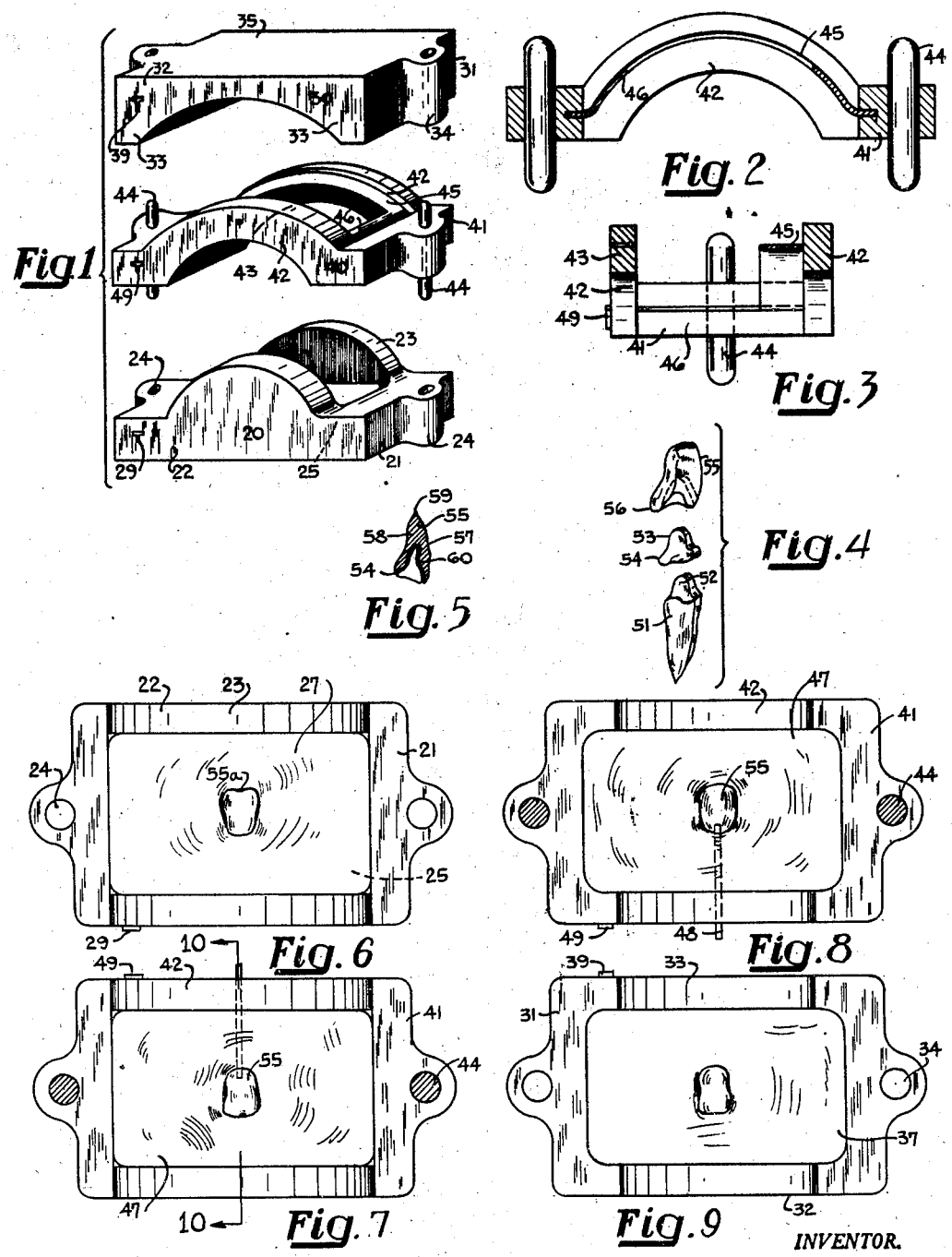
INVENTOR.
MOSKOS S. MOSKEY
BY
Morton S. Beckman Oct. 22, 1946.  M. S. MOSKEY  2,409,783
PROCESS FOR FORMING ARTIFICIAL TEETH
Original Filed March 20, 1942  2 Sheets-Sheet 2

INVENTOR.
MOSKUS S. MOSKEY
BY
Morton S Buckman

Patented Oct. 22, 1946

2,409,783

UNITED STATES PATENT OFFICE 2,409,783

PROCESS FOR FORMING ARTIFICIAL TEETH

Moskos S. Moskey, Lakewood, Ohio

Original application March 20, 1942, Serial No. 435,516. Divided and this application July 27, 1944, Serial No. 546,843

6 Claims. (Cl. 18—55.1)

This invention relates to dentistry and particularly to the process wherein dental crowns or bridges may be reproduced with a perfection and an exactness heretofore not attainable and which artificial reproductions simulate natural teeth to a very high degree.

This application is a division of the application which resulted in United States Letters Patent No. 2,368,721, granted to me on February 6, 1945 and titled Mold for forming artificial teeth.

Conducive to a clearer understanding of this invention, it may be well to point out that in manufacturing artificial teeth according to the prior art, a two-piece mould was used and that when packing such mould with the plastic material, the technician worked from the surface of the mould to the center of the hollow thereof. In other words, the artificial member was constructed in stages which were in reverse of a logical order of assembly or development. To further elucidate this point, attention is called to the fact that the prior art moulds divided the tooth member longitudinally in two parts; that is, the labial side was formed in one-half of the mould, the lingual side was formed in the other half and the two halves were joined together. Therefore, by filling each half separately in that manner the material was applied from the visible outer surface of the artificial member inwardly to the invisible central mass thereof. By these earlier methods, it was not possible to see how the surface of the tooth would finally appear before it was finished. The technician could only guess as to the final outcome for the reason that he could not get a proper view of the outer surface of the article during its build-up before it was completed.

None of the earlier inventions permitted the technician to work on the artificial member at different stages of its curing or setting period. This necessitated, at the beginning of the manufacture, the insertion of various colored slips of plastic pieces to cause the ultimate simulation of natural tooth stains, cracks or similar blemishes. The outcome of such procedure is highly speculative and the percentage of rejections or discards is quite high.

In the earlier art, no attempts were made to faithfully reproduce the lingual side of the tooth to the same degree as the labial side was reproduced. The prior devices and technique do not make possible the commercial reproduction of the lingual side of the tooth, with the result that the lingual side had by contrast a distinctly artificial appearance.

One object of this invention is to provide a systematic process for the packing of such flask and mould therein with plastic materials or acrylics which accomplish the aforementioned result.

A further object of this invention is to provide a method for building up artificial teeth in certain steps or stages so that all of the optical characteristics of a natural tooth may be better reproduced.

A still further object is to permit the construction or gradual build-up in a multi-part mould of an artificial tooth or other article from the inner central mass to the outer exposed surface thereof.

These and other objects and features of the invention will become apparent from a study of the following description and claims together with the accompanying drawings in which like parts are designated by like reference characters and wherein:

Figure 1 is an expanded perspective view of a flask made in accordance with this invention;

Figure 2 is a longitudinal cross-section of the middle element of the flask shown in Figure 1;

Figure 3 is a lateral cross-section of the same element of the aforesaid flask;

Figure 4 is an expanded perspective view of the wax model, the platinum cap and the amalgam matrix used in the process for reproducing a dental crown;

Figure 5 is a vertical cross-section of the above mentioned wax model alone;

Figure 6 is a plan view of the bottom tray of the flask with lingual impression or matrix therein;

Figure 7 is a top plan view of the intermediate section of the same flask with the wax model therein and particularly showing the labial side or part thereof;

Figure 8 is a bottom view of the intermediate section of the same flask showing the lingual side of the wax model therein;

Figure 9 is a plan view of the top tray of the same flask inverted and showing labial impression or matrix therein;

Figure 13:
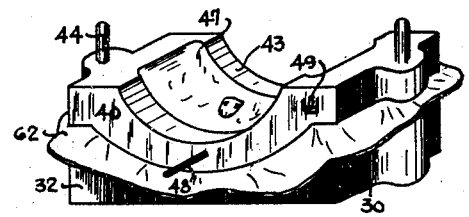
Figure 14:
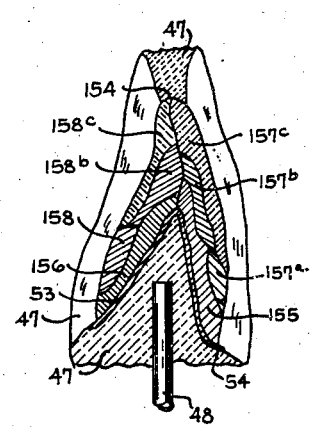

Figure 13 is a perspective view of the top tray and the intermediate section assembled with a sheet of wet Cellophane therebetween and ready for packing the lingual side of the crown; and Figure 14 is an enlarged vertical sectional view of a finished specimen crown showing the blended materials in the lingual, the labial and the intermediate parts of the crown and particularly in the gingival, medial and incisal parts thereof.

The flask

In the drawings and particularly in Figures 1, 2 and 3 thereof, there is illustrated a metal flask composed of three primary elements. There is, first, the drag or bottom tray 20; second, the cope or inverted top tray 30, and lastly the intermediate or middle section 40. Each of these parts will be described in detail and in the order just set forth.

The bottom tray 20 is a rather substantial metal piece which has a flat bottom part 25 and from which there extends upwardly two end walls 21 and the two side walls 22 forming a rectangular pan or tray-like member. Each of the two side walls 22 have extension wall portions 23 thereon which have curved top edges. Each of the end walls 21 is provided with a vertical hole 24 which receives a certain connecting pin 44 hereinafter described. The bottom tray 20 may be for most purposes approximately three inches long and about two inches wide and should be of a heavy durable construction in order to withstand the pressure applied thereto when the assembled flask is subsequently put into a press or between suitable clamps.

The top or inverted tray 30 is substantially the same as the bottom tray 20. It too has a top portion 25 from which there depend two end walls 31 and two side walls 32. The side walls 32, instead of having extended portions like the bottom tray 20, have recessed portions 33 thereon. The two end walls 31 similarly have holes 34 therein for receiving the aforementioned connecting pins 44.

The middle section 40 of the flask is hollow, that is, it does not have either top or bottom parts which are analogous to the elements 25 or 35. The middle section consists of two end walls 41 and two curved side walls 42 connected together to form an open rectangular frame. The side walls 42 are, however, curved. The lower edges thereof are recessed to snugly engage the raised extensions 23 of the bottom tray member and the top edges thereof are raised to fit the recessed portions 33 of the inverted tray member. Each of the end walls 41 is provided with a pair of extending and a pair of depending aligned pins 44 which pins engage the holes 24 and 34 of the aforesaid bottom and top trays 20 and 30 respectively in the manner shown in the drawings.

The two end walls 41 and one of the side walls 42 of the middle section 40 are provided with inwardly extending portions referred to herein as flanges 45 and 46. The flanges 46 on the two end walls are attached thereto at about the middle of the wall and extend laterally inwardly and upwardly at an angle which approximately corresponds to the curvature of the adjacent side walls 42. The flange 45 which is on the side wall 43 is curved longitudinally to correspond with the curvature of the side wall, extends inwardly a short distance and joins the two flanges 46.

The opposite curved side wall 42, the one that does not have a flange thereon, is provided with a small lateral hole 43 which will receive a small dowel or guide pin 48 hereinafter mentioned. This hole 43 is substantially in line with the aforesaid flange 45 on the side wall 43.

The aforesaid top tray and section 30 and 40, like the bottom tray 20, are substantially made of durable material and when assembled completely register and are able to receive a considerable pressure in a clamp or press, and also, when so assembled, form a closed box-like structure.

The center section of the flask in which the wax pattern is invested, is in reality an open frame which permits the operator to apply the gingival, middle third and incisal plastic as precisely as though the case were mounted upon an open model. The outside sections of the flask are used only for compression and as a lingual and labial counter-die to register and mould the material to the desired form.

For the purpose of quickly identifying the parts of each flask and so that the sections may be fitted together easily and in their proper order, each section is marked with indicia, such as by the letter "T" indicated by the characters 29, 39 and 49 of the respective elements 20, 30 and 40. These identification marks 29, 39 and 49 appear only once on each section of the flask and when the sections are assembled so that the marks appear in an ordinary arrangement, such as one above the other, the technician instantly knows that the moulds are in proper order. This marking is important, particularly when many flasks are used, as the time usually taken to examine each part to see that it fits properly and to try each section to see that the parts of the mould are related is saved.

The technique

The technique of preparing the tooth model for the herein described flask and process is substantially the same as the preparation of the model for a conventional porcelain crown. That is, a stone or an amalgam die 51 having a model 52 of the natural tooth stump thereon is prepared, over which there is swaged a platinum matrix 53 having walls of about one-thousandth of an inch thick. A small shoulder should be formed on the portion of the matrix 53 which will be adjacent to the gingival portion 54 of the artificial tooth or crown. The wax model 55 and the matrix 53 together, as shown in the Figure 5, are removed from the die 51 and are inserted in the flask, as directed in the following procedure.

In the process of making the mould, a mixture of powdered stone, plaster and water is prepared which has a thicker-than-cream consistency. This mixture is hereinafter referred to as the investment, and is indicated by the reference character 47 when used in the middle section 40, by the character 27 when used in the bottom or convex tray 20, and by 37 when used in the top or concave tray 30. The matrix 53 is filled with some of the plastic investment 47 and is set aside temporarily until it becomes stiffer but not quite solid. A small piece of wire or a nail, herein called a guide pin 48, is inserted through the opening 43 in the side wall 42 of the middle section of the flask. If more than one tooth is to be processed, then a separate guide pin 48 should be inserted for each tooth. While the drawings show only one hole 43 in the side wall 42, it should be understood that many more may be drilled if the nature of the work requires them.

The middle section of the mould is prepared first. The investment 47 is built up from the side wall 42 having the hole therein for the removable pin 48. The investment tapers inward and stops at a point a little short of the inner end of the pin 48 or to about where the gingival edge of the crown will come. The wax model 55 of the tooth is then mounted on the inner end of the pin 48 so that it is approximately in the center of the section and so that the lingual side 58 of the tooth model faces the concave side of the section. The wax model 55 is held in place on the end of the pin by the still plastic investment in the matrix 53 and also by the investment built up from the wall that adheres to the small flange or shoulder 54 of the matrix.

Figure 10:
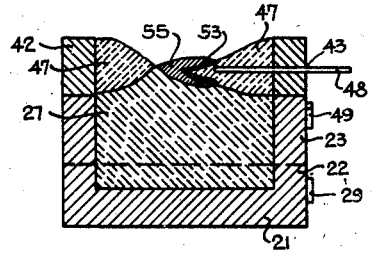
Figure 10 is a vertical lateral cross-section of combined bottom tray and intermediate section showing the wax model, the platinum cap and the guide pin used for supporting the model and cap in the soft investment material, the view being a section along the line and in the direction of the arrows 10—10 of the Figure 7.

Other investment material 47 is then used to fill the section and to neatly encircle the wax model 55. The material tapers inward from the two ends and the other side walls and is supported while plastic thereon by the flanges 45 and 46 of the section. The investment 47 touches the model 55 at the peripheral edge thereof only. The investment tapers sharply from the walls as is shown in the Figure 10, and only a very narrow frame of the material is formed around the largest circumference of the model. The portion of the crown adjacent to or contacted by the investment 47, which portion includes the incisal and sides, is hereinafter referred to as the medial portion and is indicated in the Figure 14 by the character 154. The investment 47 is allowed to set and thoroughly harden.

After the investment 47 has set, a separating medium such as sodium silicate is applied to both sides thereof. Next, a little of the fresh, soft investment material 27 is carefully painted or spread over the exposed lingual surface 58 of the wax model and over the investment 47 adjacent thereto which was previously coated with the separating medium. A fresh relatively soft investment is preferably used in order to insure an accurate reproduction of the model.

The bottom tray 20 is then filled with some material 27 which has a slightly thicker consistency and the section 40 and tray 20 are assembled. Similarly a small amount of thin investment is spread on the labial surface 57 of the model and over some of the treated investment 47 adjacent thereto. The top tray 30 is also filled with some of the thicker investment 37 and then placed on the section 40. The assembled flask sections 20, 30 and 40 are pressed together so that all excess investment material 27 and 37 is allowed to come out and so that an accurate impression of both sides of the model is obtained. The closed and assembled flask is then allowed to set until the investments 27 and 37 in the top and bottom trays have completely hardened. At this stage, better results are obtained if the flask is pressed or the three sections tightly held in a clamp of some sort.

Figure 11:
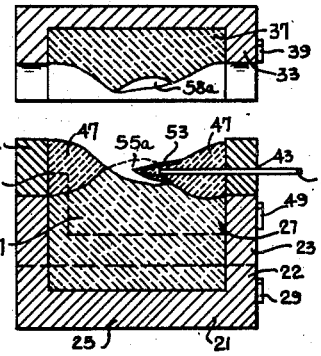
Figure 11 is a vertical cross-sectional view of the mould partly expanded with wax model removed and just showing the platinum cap and the aforesaid guide pin.

After the investment materials 27 and 37 have set and hardened, the top and bottom trays 20 and 30 are separated from the middle section 40. The wax model 55 is removed therefrom by boiling the middle section in hot water for about ten minutes. The wax model 55 is thus dissolved. The hollow in the flask is exactly the shape of the wax model. The depression formed in the bottom member 20 is the mould for the lingual side 58 of the tooth. The depression formed in the top member 30 is the mould for the labial side 57 of the tooth. In the Figure 11, this labial mould is indicated by the reference character 58a. The narrow band or frame in the center of the middle section 40 which formerly touched the peripheral edge or circumference of the wax model 55 is now the mould for the thin contour 154 of the tooth and is that portion of the entire mould between the lingual and labial moulds. This then leaves the platinum matrix 53 exposed in the opening 55a of the section 40. Feather edges and rough spots on the investments 27, 37 and 47 are carefully carved away and the pattern is gently smoothed out in the conventional manner.

If desired, a thin coat of very transparent resin may be applied to the lingual and labial surfaces of the crown as indicated in Figure 14 by the characters 155 and 156. This is like the thin enamel coating on a natural tooth and tends to create an optical effect which has a very realistic appearance.

In the process of making the mould from the wax model, it is immaterial which of the trays 20 or 30 is made first. As the process was just described, the bottom tray 20 with the lingual mould was set forth first but it should be obvious that the labial mould could be prepared immediately after the preparation of the middle section. Also, it should be noted that the two trays 20 and 30, with their respective lingual and labial moulds, could be prepared simultaneously.

Figure 12:
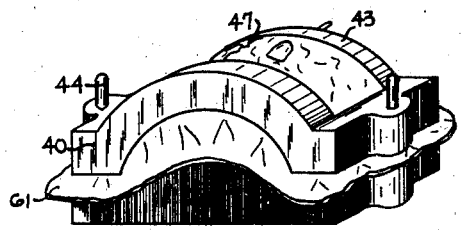
Figure 12 is a perspective view of the bottom tray and the intermediate section assembled with a sheet of wet Cellophane therebetween and ready for packing the labial side of the crown.

The next broad step consists of packing the acrylic mould formed by the hardened investment materials 27, 37 and 47. However, before packing the mould with the thermoplastic or thermo-setting material, whichever is used to form the ultimate artificial tooth or crown, the walls and edges of the mould should be painted with more thin sodium silicate to assure maximum smoothness, hardness and strength thereof. This thermoplastic or thermo-setting material of which the crown is to be made is referred to hereinafter simply as resin. When the sodium silicate coat is dry, a piece of moistened Cellophane 61 is then placed between the lingual section or tray 20 of the flask and the middle section 40 thereof, as shown in the Figure 12. This leaves the labial and the middle portions of the mould exposed for packing. The Cellophane film is used to prevent adhesion of the plastic resin to the lingual mould.

First, the labial side of the platinum matrix 53 is covered with plastic resin 155. This may be an opaque resin of suitable color and shade. Second, the resin 157a is applied over the resin 155 near the gingival edge. This resin may be a little more transparent than the resin 155 and its shade may be affected by the underlying resin 155. Third, the resin 157b is applied over the other resins 155 and 157a. This likewise may be a little more transparent than the former two resins. Next, the resin 157c is applied over the other three. This last resin 157c is more transparent than the others.

The resins should be properly tinted and have the required degrees of transparency so that the finished crown will have an appearance of depth and solidity. Each layer of resin 157a, 157b and 157c should be tapered so that the colors and shades blend into each other naturally to create the appearance of a real tooth.

At this stage, the outer surface of the crown is rough and crude. As yet it has not been impressed with the labial mould. The quantities of resin applied are only estimated as being sufficient to fill the labial mould.

After the material has been applied labially as aforesaid, a second piece of dampened Cellophane 62 is placed on the surface of the labial section or inverted tray 30 of the flask and the middle section 40 and the bottom tray 20 are placed over it, using finger pressure only to bring the sections together. The bottom tray 20 or lingual section is removed together with the Cellophane 61, thus exposing the lingual portion of the mould for packing.

The lingual area is then packed in the same manner as the labial; that is, the resins 158a, 158b and 158c are laid and blended as needed, except that a little more material is used to obtain greater bulk and so that better compression of the materials is obtained. Upon completion of the packing, the dampened Cellophane 61 is again applied to the lingual section of the flask as aforesaid. The three parts of the flask are then assembled and locked in a portable clamp and prepared for a test pack. The clamped flask is then placed in boiling water for about three minutes or for a duration of time which partially cures the resin and is then opened for corrections. Excess material may be removed from the lingual side. Special stains or coloring may then be applied to the exposed lingual and labial surfaces of the unfinished crown. The middle section may be held up to the light or held near a darkened cavity practically simulating an oral cavity so that the translucency of the incisal edge may be checked. If desired, the entire incisal may be cut out and repacked with a more or less translucent mix if needed. Repacking, however, should be done from the labial side first and following the same procedure as described above. Next, moist Cellophane is placed between the sections and the flask is tightly closed with full compression in a suitable clamp or press. The plastic resin is cured for at least one hour, after which it should be thoroughly cooled in cold water before being opened.

After the flask sections 20, 30 and 40 are opened and separated, the guide pin 48 is removed from the middle section. This may be easily done with a pair of pliers. The investment material 47 is carefully broken away from around the circumference of the crown. The platinum matrix 53 is peeled from inside the recess 56 of the crown so that it may be set up on the original die 51 for finishing and polishing in the conventional manner.

For the purpose of simplicity, the technique as described and illustrated herein is for a simple jacket crown. However, it should be understood that bridges and other types of artificial teeth may be constructed in much the same manner. Persons skilled in the art may readily adapt the foregoing technique to that of the preparation of bridges, for example. However, it has been found that in the case of bridge work, best results are obtained if a proper reinforcing bar is used to connect whatever abutments are used in the case.

In bridgework involving two or more teeth, the reinforcing bar should be positioned midway between the tissue and incisal and should be shaped to conform with the contour of the gum line. After the bar is soldered to the abutments, the skeleton is placed on the model and the wax dummy is carved. The wax form may then be removed and tried in the mouth for bite and fit and when found satisfactory, the wax bridge form is invested in the flask in the same way as for the single jacket crown heretofore described, using as many guide pins 48 as are necessary to hold it in place while the investment material is packed around it. The labial and lingual sides of the pattern are thus exposed the same way.

It will now be clear that there is provided by this invention a process for forming artificial teeth which accomplishes the objects set forth herein. While the invention has been disclosed in its preferred form, it is to be understood that the embodiment thereof as described and illustrated is not to be considered in a limited sense as there may be other forms or modifications of the invention which should also be considered to be within the scope of the appended claims.

I claim:

1. The method of forming an artificial tooth, comprising, first, forming a separable three-piece mould of the tooth to be formed, the first piece of the mould having the impression of the labial portion, the second piece having the impression of the lingual portion and the middle piece having the impression of the medial portion of the tooth; second, assembling the second and middle pieces of the mould and roughly packing therein the material forming the lingual portion of the tooth; third, assembling the first and middle pieces of the mould and roughly packing therein and on the aforesaid material other material forming the labial portion of the tooth; and fourth, assembling the first, second and middle pieces of the mould and finally moulding and forming the complete tooth therein with the aforesaid roughly packed materials.

2. The method of forming an artificial tooth, comprising, first, forming a separable three-piece mould of the tooth to be formed, the first piece of the mould having the impression of the labial portion, the second piece having the impression of the lingual portion and the middle piece having the impression of the medial portion of the tooth; second, assembling the second and middle pieces of the mould and roughly packing and blending therein materials of different shades and different degress of transparency, thus forming the lingual portion of the tooth; third, assembling the first and middle pieces of the mould and roughly packing therein and on the aforesaid materials other material forming the labial portion of the tooth; and fourth, assembling the first, second and middle pieces of the mould and finally moulding and forming the complete tooth therein with the aforesaid roughly packed materials.

3. The method of forming an artificial tooth, comprising, first, forming a separable three-piece mould of the tooth to be formed, the first piece of the mould having the impression of the labial portion, the second piece having the impression of the lingual portion and the middle piece having the impression of the medial portion of the tooth; second, assembling the second and middle pieces of the mould and roughly packing and blending therein materials of different shades and different degress of transparency, thus forming the lingual portion of the tooth; third, assembling the first and middle pieces of the mould and roughly packing and blending therein and on the aforesaid materials other materials of different shades and different degrees of opacity, thus forming the labial portion of the tooth; and fourth, assembling the first, second and middle pieces of the mould and finally moulding and forming the complete tooth therein with the aforesaid roughly packed materials.

4. The method of forming an artificial tooth, comprising, first, forming a separable three-piece mould of the tooth to be formed, the first piece of the mould having the impression of the labial portion, the second piece having the impression of the lingual portion and the middle piece having the impression of the medial portion of the tooth; second, assembling the second and middle pieces of the mould and roughly packing therein the material forming the lingual portion of the tooth; third, assembling the first and middle pieces of the mould and roughly packing therein and on the aforesaid material other material forming the labial portion of the tooth; fourth, assembling the first, second and middle pieces of the mould and moulding the complete tooth therein with the aforesaid roughly packed materials; fifth, removing the first piece of the mould and staining the material exposed thereby to simulate natural blemishes; and sixth, reassembling all of the pieces of the mould and curing the material therein to form a finished artificial tooth.

5. The method of forming an artificial tooth, comprising, first, forming a separable three-piece mould of the tooth to be formed, the first piece of the mould having the impression of the labial portion, the second piece having the impression of the lingual portion and the middle piece having the impression of the medial portion of the tooth; second, assembling the second and middle pieces of the mould and roughly packing and blending therein materials of different shades and different degrees of transparency, thus forming the lingual portion of the tooth; third, assembling the first and middle pieces of the mould and roughly packing and blending therein and on the aforesaid materials other materials of different shades and different degrees of opacity, thus forming the labial portion of the tooth; fourth, assembling the first, second and middle pieces of the mould and moulding the complete tooth therein with the aforesaid roughly packed materials; fifth, removing the first piece of the mould and staining the material exposed thereby to simulate natural blemishes; and sixth, reassembling all of the pieces of the mould and curing the material therein to form a finished artificial tooth.

6. The method of forming an artificial tooth, comprising, first, forming a separable three-piece mould of the tooth to be formed, the first piece of the mould having the impression of the labial portion, the second piece having the impression of the lingual portion and the middle piece having the impression of the medial portion of the tooth; second, coating the lingual and labial surfaces of the labial and lingual portion of the mold pieces with a thin transparent resin; third, assembling the second and middle pieces of the mould and roughly packing therein the material forming the labial portion of the tooth; fourth, assembling the first and middle pieces of the mould and roughly packing therein and on the aforesaid material other material forming the lingual portion of the tooth; fifth, assembling the first, second and middle pieces of the mould and then moulding and setting the complete tooth therein of the aforesaid roughly packed material.

MOSKOS S. MOSKEY.